(12) United States Patent
Dodgen

(10) Patent No.: US 6,453,329 B1
(45) Date of Patent: Sep. 17, 2002

(54) METHOD FOR TRANSLATING DISTILLED FILED FOR HANDLING OF LARGE DATA FILES AND PROGRAMS BY COMPUTING DEVICES WITH LIMITED PROCESSING CAPABILITY

(76) Inventor: Stephen Dodgen, 6824 Viking Dr., Waco, TX (US) 76710

( * ) Notice: Subject to any disclaimer, the term of this patent is extended or adjusted under 35 U.S.C. 154(b) by 107 days.

(21) Appl. No.: 09/634,423

(22) Filed: Aug. 8, 2000

(51) Int. Cl.7 .......................... G06F 17/21; G06F 15/16
(52) U.S. Cl. ....................................... 707/516; 709/246
(58) Field of Search ................................ 709/217, 246, 709/247, 328; 379/106.03; 370/466; 707/516

(56) References Cited

U.S. PATENT DOCUMENTS

| | | | | | |
|---|---|---|---|---|---|
| 5,790,809 A | * | 8/1998 | Holmes | ....................... | 370/466 |
| 6,041,365 A | * | 3/2000 | Kleinerman | ................ | 709/328 |
| 6,073,174 A | * | 6/2000 | Montgomerie et al. | | 379/106.03 |
| 6,304,915 B1 | * | 10/2001 | Nguyen et al. | ............. | 709/217 |

* cited by examiner

Primary Examiner—Le Hien Luu
(74) Attorney, Agent, or Firm—David G. Henry

(57) ABSTRACT

The technology of the present invention allows the creation of a single master document, called a script, to serve multiple functions by defining a set of data fields as well as a hierarchy of organization in terms of token-value pairs. By applying a "distillation" process the content of the script may be optimized, effectively compressing the script for various purposes such as user interface generation, data processing, or data transmission. The size of a set of data records, for example, may be greatly reduced by separating the content of the data from the meaning, permitting a computer with limited resources such as a hand-held unit to transmit a very large amount of data in a small data record along with a "meaning token". The distilled data package may then be expanded by the receiving unit using the "meaning token" in the package, which contains the instructions for the expansion process. Additionally, the script allows automatic creation of complex user interfaces and database storage without human intervention.

4 Claims, 1 Drawing Sheet

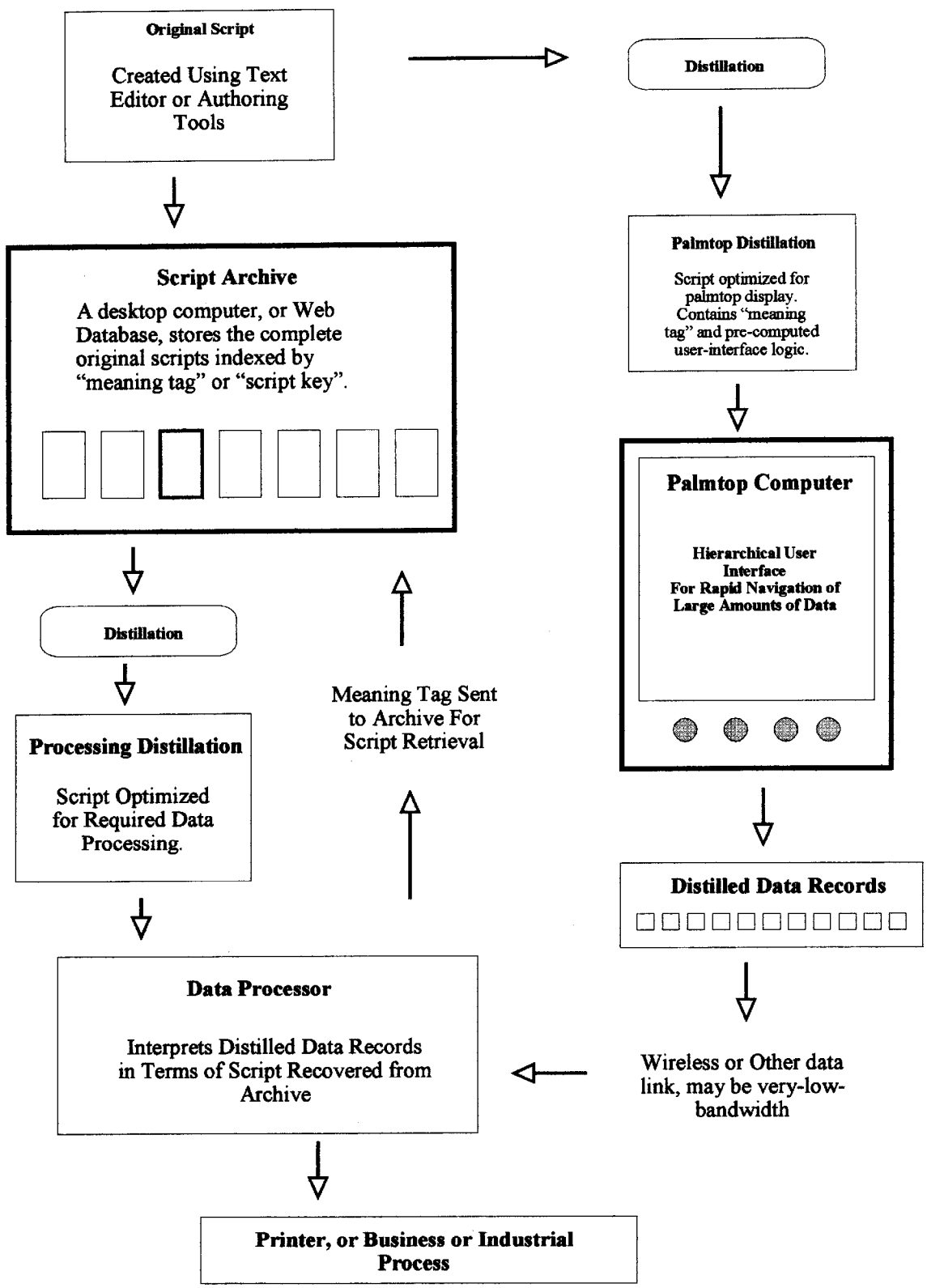

METHOD FOR TRANSLATING DISTILLED FILED FOR HANDLING OF LARGE DATA FILES AND PROGRAMS BY COMPUTING DEVICES WITH LIMITED PROCESSING CAPABILITY

FIELD OF THE INVENTION

The present invention relates to computer programming and data storage and transmission methods, as well as to user interface methods.

BACKGROUND OF THE INVENTION

A. General Background of Problem and Overview of Present Solution

Handheld computers (also known as "palms" or "palmtops" are increasing in popularity. They are small, light, and can do many desired tasks without the user having to carry, boot-up, charge, etc. a laptop of other computer-type alternative.

A serious limitation of all palmtops relates to their capacity to store information. Palmtops lack hard drives, and must store whatever information is to be stored in hardware memory. Memory can be expanded only to a finite degree without sacrificing the very size and weight characteristics for which palmtops were designed, and nothing resembling hard drives, as such, is likely to be found in palmtops in the foreseeable future.

The only material way in which the capabilities for palmtops to manage larger volumes of information in the foreseeable future is through manipulation and management of the information itself, not through changes in the architecture of the palmtops.

The present invention presents a programming and data management methodology which greatly advances the capacity of a palmtop to retrieve and process information to a magnitude far beyond any comparable quantitative level as might be achieved through use of prior art data management methods, or through reasonable changes in palmtop construction.

As will be discussed below in considerable detail, properly allocating data gathering and data processing and interpretation tasks between a palmtop and a central computing unit increases a palmtop's capacity to prompt a user in providing, and then retrieve and store information for later processing in volumes far in excess of that possible with a palmtop's present capabilities while using present art data management and programming regimens.

B. Present State of the Art

The current state-of-the-art for remote user-interface generation and reporting is the hypertext markup language or "HTML". This system differs in lacking the data distillation aspect. This weakness is manifested in several ways:

1) When the script is transferred to the remote computer, the entire script is transferred, placing a greater burden on the bandwidth and storage requirements of the remote system.

2) The remote computer must deal with the original HTML document, which requires it to parse and process enormous amounts of data irrelevant to the purpose of user interface generation.

3) When a data record or "form" is returned from the remote site, field identifiers are attached to each field individually, vastly increasing the bandwidth requirement of the interaction. In the present system, data can be identified by it's position within a highly compacted data record, eliminating the need to transfer the id tags.

4) HTML does not provide a platform-independent binary representation of the user interface. This requires extensive parsing functions to be provided by the system used to display the interface. The present distillation process can produce, as one aspect of the document, a binary representation that can be used on any computer.

5) The automatic generation of a hierarchical representation when distilling the script for the user interface process eliminates the "infinite maze" problem found in conventional hypertext systems, where the "forward/back" paradigm commonly used does not give the user a clear mental image of the organization of the document.

Another language to be discussed in the data management realm is XML (extensible markup language). XML allows the development of custom tags, but does not contain the concept of distillation/expansion contained in the present invention. In fact, XML could be used as the underlying scripting language in a document distillation system. XML also differs conceptually in that it provides a document TYPE definition rather than a document INSTANCE definition. In other words, XML document processors refer to a template that describes in general terms the meaning of custom tags in the language, while a processor that operates on one of the distilled data records employed in the present methodology may also refer to the original document itself, which provides much more flexible and powerful processing capabilities, as well as the extreme data density allowed by the distillation process.

Conventional data compression techniques fall into two classes, "lossless" and "lossy". An example of a lossy mechanism is that employed by conventional JPEG image files on the internet. Compression ratios in the range 50 or 100 to 1 are common, but at the expense of imperfect reconstruction of the original image. This is considered an acceptable tradeoff given the desire for rapid downloading of images.

In transferring data such as text, or selections from checkboxes on a user interface, clearly lossless compression is necessary. Lossless compression algorithms such as Lempel-Ziv-Welch (LZW) compression or Huffman encoding typically produce compression ratios on the order of two-to-one, depending on the type of data.

Consider a hypothetical example of a survey form consisting of 1000 checkboxes each with a twelve-character idtag as required by a conventional html system (the number twelve is an arbitrary but conservative estimate of the size of a typical field idtag, most programmers use "symbols" this large or larger). The data required for a single record by the conventional system would be at least (assuming no other formatting overhead and that the state of each checkbox is transmitted as a single byte of data):

$$1000*12+1000*1=13000 \text{ bytes.}$$

According to the present methodology, the data required is 4 bytes for the tag required to identify the original script, plus 1 bit per checkbox:

$$4+1000/8=129 \text{ bytes.}$$

This yields an effective compression ratio of:

$$13000/129=100.77$$

Note that conventional compression schemes may be applied "on top of" the data representations employed by the subject methodology, thereby resulting in further reductions.

Concerning external data representation, computer platforms differ in their binary format for representing data. For example, in many palmtop computers integers are stored using most-significant-byte-first format, whereas on standard PC platforms integers are stored in a least-significant-byte first format. The byte ordering must be reversed for data generated on one platform before it may be utilized on computers of the other platform.

In conventional systems such as the "remote procedure call" (RPC) system and the "sockets" system, which move data between different computer platforms, the process involves two stages of data translation into an intermediate "external" data representation, with the associated overhead. This intermediate representation may be binary or text-based, but always requires two translation layers.

According to the present invention, data is stored in the native format of the "low powered" system and is transformed only at the time of use. There is no wasted format translation, and no translation at all is required of the less capable platform.

Consider the following comparison between conventional inter-platform exchange and data exchange in accordance with the present invention:

Conventional Inter-platform Exchange.
  Data entered on mobile system in native format
  All data translated to "portable" format
  Data sent to host computer
  All data translated to host format
  Some data accessed and used by host
The Current Invention's Inter-platform Exchange.
  Data entered on mobile system in native format
  Data sent to host system.
  Data translated to host format only as required.

SUMMARY OF THE INVENTION

In what follows, note that the present techniques are not specific to the script syntax given as examples. In principle the present distillation mechanisms could be applied to industry-standard HTML, XML, or scripts based on other commonly used languages.

The methodologies of the present invention solve several problems associated with software development in general and mobile computing in particular:

Optimal use of limited bandwidth. The very-efficient data storage strategies of the present invention methodologies allow handheld computers with low data rate connections to transfer huge amounts of data. Today a central problem in practical computer usage is the ability to transfer information between networked computers. In desktop computers it is now common for home computers to have multi-megabit data rate connections to the internet through cable modems or other so-called "broadband" technologies. Palmtop computers are severely limited in their communications bandwidth, often operating over wireless connections at data rates of 9600 bps (bits per second) or even lower. This is a serious obstacle to the deployment of palmtop computers in remote data gathering applications.

Traditional data compression techniques cannot achieve compression ratios of greater than about two-to-one without loss of data. Higher ratios are possible for image data, but only in the case where image degradation through imperfect reconstruction is acceptable. Such popular image formats as "jpeg" use such techniques, but such "lossy" mechanisms are not applicable to transmission of binary data records of the type required by remote data collection applications.

Optimal use of limited memory and processing power on mobile and hand-held computer platforms. The "distilled" data records and documents of the present invention allow software applications with unprecedented levels of complexity to be stored and displayed rapidly on handheld computers with extremely limited processing power and memory.

By removing information from the script that is irrelevant to the user-interface process, the parsing of the script is simplified on the handheld computer, giving its users operational capabilities far in excess of that now possible with present day data management and structure, and presently otherwise possible only with vastly increased computing power. Many of the handheld computers often are entirely without the disk storage that is taken for granted on most desk top computers. In these devices all data records must be stored in small non-volatile memories, which are extremely limited in size. While a conventional word processing application may be able to use a megabyte of data for a simple document, handheld applications have no such luxury.

By completely separating the "meaning" of the data from the data itself, one achieves very high "information density", making it possible to store large numbers of data records in even the limited memory of a diskless handheld computer.

Enhanced software productivity. The new document types involved in the present invention allow a non-technical user, generally a "domain expert" or expert in the subject matter, to create the content, data flow, storage elements, and screen elements without the need for programmer involvement. This enables true software development by people with NO software background, and in fact even those with marginal computer literacy skills.

Enhanced ability to capture expert knowledge and user Requirements. The knowledge-capture process is a perennial block to productivity in the software realm. The presently described new document types allow the domain expert to perform his or her own knowledge capture without programmer involvement. Given the script which defines the data elements which the content developer wishes to capture, the present combined distillation/expansion processes automatically perform user-interface creation, allocation of data storage, and report generation. The domain expert is therefore required only to specify the problem, the solution is generated automatically.

The syntax of the scripting language used is not critical to the process. An example is given here, which emphasizes a plain-English syntax to enhance readability. Such a language has in fact been used directly by non-technical users with brief training. Simple authoring tools based on the well known RAD (rapid application development) paradigm are also possible to further simplify script creation.

Ability to navigate very large amounts of data easily. "Information overload" is a serious problem with current computing paradigms. The ability of the present documents to automatically specify a hierarchical representation, and to specify filters which suppress irrelevant information, allow a user to navigate an unprecedented quantity of data in an extremely fast and efficient manner.

This problem of information overload and document navigation is particularly severe in the handheld arena, where display sizes are very limited. The hierarchy of display and filtering capabilities are essential to making practical the extraordinarily complex applications that are and will be required on handheld computers.

Well-defined separation of client-side and server-side workload. In the present system, the different distillations clearly delineate the purposes and responsibilities of different subsystems: The handheld component (the "information retrieval computer"), who's advantage is mobility and simplicity, is responsible for acquiring and transmitting data. The "host" or "server" component (the "data processing computer"), is responsible for associating data records with the original scripts, and for performing processing that is beyond the scope of the handheld system.

In what follows, the new document type involved in practice of the present invention will be a "script". A script defines a set of data fields as well as a hierarchy of organization. A script consists of token-value pairs. The specific tokens used here are not important, and in fact other tokens are substituted in some implementations.

The exact syntax of the script is likewise irrelevant. The token=value syntax presented here is only one possible implementation.

Script aspects. A key element of the script is the specification of multiple "aspects" of the problem in a way that can be "distilled" so that different users or computer systems need only deal with those aspects that concern them, and yet the different aspects may still interact when the results of different processes are combined by the expansion apparatus. Described in more detail below are some possible aspects, which are among those used in the present invention's experimental implementation:

The data field aspect

The representation hierarchy aspect

The contextual Filter aspect

The data processing aspect

The data position aspect

The field-idtag aspect

The user-defined aspect

The constraint aspect

The page-layout aspect

Clearly other aspects are possible. The accompanying sample script illustrates some possible aspects including the ones mentioned here.

The data field aspect. This aspect allows the specification of individual data-entry fields, which may be simple or complex and have an associated data type.

A simple example is a checkbox:
BEGIN FIELD
   FIELD TYPE=checkbox
   LABEL=cardio pulmonary arrest
END FIELD This script specifies that one wishes to create a checkbox and to label the checkbox "cardio pulmonary arrest". This is the most primitive aspect, which is combined with other script aspects to provide the significant benefits of the present invention.

The representation hierarchy aspect. The script defines a hierarchy of representation for the data, allowing the building of user interfaces using a shallow-tree hierarchy. This is done by defining sections and subsections within the script, which can then be used by a distillation device to produce a navigation hierarchy. One example of a syntax which accomplishes this is as follows:
BEGIN SECTION=(section 1 name)
  BEGIN SUBSECTION=(subsection 1.1 name)
    BEGIN FIELD
    . . .
    END FIELD
  END SUBSECTION
  BEGIN SUBSECTION=subsection 1.2 name
    BEGIN FIELD
    . . .
    END FIELD
  END SUBSECTION
END SECTION
BEGIN SECTION=(section 2 name)
  . . .
END SECTION For example, in a palm computer implementation developed according to the subject invention, the end product allows up to 20 script sections with 20 subsections per section. This allows a user, with only two pen taps on a mobile computer with a very limited display, to access 400 different subsections of a computer application. Each of these subsections may contain an arbitrary number of fields which can then be found using page-forward/page-back commands much like a conventional book or multi-page form.

This hierarchy may be extended by the nesting of fields:
BEGIN FIELD
  FIELD TYPE=checkbox
  . . .
  BEGIN FIELD
    FIELD TYPE=popup list
    . . .
  END FIELD
END FIELD In this manner, by enabling fields to be contained within other fields and only displayed when "triggered" by use of the enclosing fields, the hierarchy may be extended to whatever depth required.

The contextual filter aspect. To further enable the navigation of extremely large data sets with very limited computer resources and limited display sizes, scripts allow the definition of "topics", "detail levels", and other filtering mechanisms which can enable the display apparatus to selectively limit the display of data fields.

For example, envision a medical application in which one wishes to display certain fields only if the user's patient is suffering from a particular problem. One can then specify topics in the script . . .
BEGIN TOPIC DEFINITIONS
  BEGIN TOPIC
    TOPIC IDTAG=Major Burn
  END TOPIC
  BEGIN TOPIC
    TOPIC IDTAG=Chest Pain
  END TOPIC
END TOPIC DEFINITIONS One can then specify that the following field is only relevant for the "Burn" topic:
BEGIN FIELD
  FIELD TYPE=checkbox
  LABEL=smoke inhalation
  TOPIC=Major Burn
END FIELD Now the distillation apparatus may, at the time the field is presented, choose to display or not display each field based on the current context. The value of this filtering mechanism is greatly enhanced by the distillation process, which creates a new version of the script in which the enable status of each field is encoded in a single bit for each topic. This distilled version is delivered to the user-interface process, which thus is not required to perform the computationally-intensive parsing operations that would be required by prior-art script processing systems in order to determine the run-time form of the user interface.

Other contextual filters are possible and have been implemented. For example, the following field is only relevant for females in a certain age range. Note the SEX and AGE filters which are now included in the field . . .

```
BEGIN FIELD
   FIELD TYPE=yesno
   LABEL=home pregnancy test used
   SEX=female
   MIN AGE YEARS=10
   MAX AGE YEARS=55
END FIELD
```

The data processing aspect. Data records produced using the script will in general be used for some type of analysis or reporting. Two examples are a printing process and an invoice-generation process.

Suppose, for example, we have an automatic printing process which composes text based on the labels within a field. Suppose further that we have a "yes/no" control type where we wish to print a specific format in the "no" case. We might then use a "print control" aspect to override the default printing logic:

```
BEGIN FIELD
   FIELD TYPE=yesno
   LABEL=remembers traumatic event
      PRINTCON IFNO PRINT=does not remember
      traumatic event
END FIELD
```

Consider a second example where an invoice generation process is used to automatically produce items based on the content of a distilled data record. To the user interface, this process is irrelevant, while to the billing process it is crucial. In the following field, we have used a BILLING CODE directive as an example of a data-processing aspect . . .

```
BEGIN FIELD
   FIELD TYPE=yesno
   LABEL=Patient defibrillated
   BILLING CODE=12345
END FIELD
```

Clearly other such processing aspects are possible.

The data Position aspect. This aspect of the data is implicit within the script and depends on the simple observation that each field has a specific position within the overall script. The fields can simply be numbered from 1 to "N" where "N" is the total number of fields within the script. While seemingly trivial, this fact implies the ability to obtain the very efficient data storage described below.

The field-idtag aspect. This aspect allows any field in the system to be "tagged" with a symbol, which may be used to identify the field unambiguously from another field or to provide special processing for that field. For example, suppose that we wish to present the same data field in two different locations in the same user interface. The first field in the following example creates a checkbox. The second takes advantage of the field idtag aspect to create a duplicate field, which will be slaved to the same database information and present the same label. Note also that other aspects of the field, such as the conditions under which it will be enabled, may be over-ridden by the duplicate field:

```
BEGIN FIELD
   FIELD TYPE=checkbox
   LABEL=normal HEENT exam
   PRINTCON USERDEFINED
   FIELD IDTAG=normal HEENT exam
END FIELD
.
.
.
BEGIN FIELD
   DUPLICATE=normal HEENT exam
   DEFAULT DLEVEL2
END FIELD
```

Another use of the field idtag is to provide customized or non-standard processing for an individual field. One such example is outlined in the section discussing the "user-defined" aspect.

Note that field idtags may either be generated by hand, or be automatically generated by a script processing stage. Automated authoring tools may be used to guarantee that the idtags are unique and persistent across script revisions, so that custom processing will not be lost or disrupted when the script is edited.

In conventional script and computer language processing, the idtag concept is embodied as a "symbol table". These are usually based on hashing or tree algorithms which require operating system support for large dynamic memory structures and look-up algorithms. In the present implementation, when the distillation process generates a version of the script for use in data storage or user interface generation, we may use the data position aspect to replace the idtag with a simple numeric index, which allows inter-field references to be no more complex than array references. This makes idtags practical in a resource-constrained system such as a handheld computer.

The user-defined aspect.
Consider the following field definition:

```
BEGIN FIELD
   FIELD TYPE=checkbox
   LABEL=normal HEENT exam
   PRINTCON USERDEFINED
   FIELD IDTAG=normal HEENT exam
END FIELD
```

Note the "PRINTCON USERDEFINED" tag. This informs the system that when this data is printed, the text to be printed is to be taken from a file generated by the user and associated with this field using the FIELD IDTAG. In the case where different users desire different custom processing, a separate file of user definitions is associated with every handheld device, and within that file field idtags are used to identify the fields to which custom processing applies. In this way the processing of the script may be completely customized on a per-user basis. The distilled data record need only be transmitted with some identifier specifying the originator, and the processing modified accordingly by the server-based data processing.

The constraint aspect. It is useful in many user interfaces to build in "constraints" on the data that may be entered, such as ranges on the data or inter-field constraints on data items that are mutually exclusive. An example is a set of checkboxes which are mutually exclusive, conventionally known as "radio buttons". This constraint may be applied by a "group identifier syntax" such as the following:

```
CREATE AUTO GROUP ID
BEGIN FIELD
   FIELD TYPE=checkbox
   LABEL=Patient arrived via ambulance.
   GROUP ID=auto
END FIELD
BEGIN FIELD
```

LABEL=Patient was brought in by parents
GROUP ID=auto
END FIELD
Clearly other such constraints are possible.

The page layout aspect. In general a distillation apparatus can produce a user interface using only the hierarchy and field definitions. However, one aspect of the script allows us to override this automatic mechanism with tokens that give explicit "hints" or "directives" to the distillation apparatus. For example, if we wish two fields to appear side-by-side on the display where the automatic user interface generation would normally place the second field on a new line, we might write as follows (note the SUPPRESS LINEFEED directive)

BEGIN FIELD
    FIELD TYPE=checkbox
    LABEL=Fever
END FIELD
BEGIN FIELD
    FIELD TYPE=checkbox
    LABEL=Sore Throat
    SUPPRESS LINEFEED
END FIELD Clearly other such directives are possible to selectively override aspects of the automatic generation of user interfaces.

BRIEF DESCRIPTION OF THE DRAWING

FIG. 1 is a flowchart showing how the system operates in practice. Initially the entire script is created using a text editor, or by means of the simplified authoring tools which do not require a high degree of programming expertise. The desktop computer or Web Database stores the entire script, indexing it by "meaning tag" or "script key". In the drawing, two different branches of distillation are shown. One, the palmtop distillation, optimizes the script for display, and contains the "meaning tag" and pre-computed user-interface logic. In the other branch, the distillation process optimizes the script for data processing according to the requirements of the situation.

During the palmtop distillation process, a hierarchical user interface has been created, allowing rapid navigation of large amounts of data and thus, a very efficient data entry process by the user. After the data have been entered, they are transmitted along with the "meaning key" back to the data processor. This transmission, because of the minimal size of the packet, does not require a high bandwidth data link.

Upon receiving the data and the "meaning key" (or "translation means" in the claims) the processor sends the key to the storage archive to retrieve the script and optimize it for data processing. The data may then be used for any or all of the usual activities; printed or stored patient records, billing procedures, or any other desired purpose.

DETAILED DESCRIPTION OF THE INVENTION

The present invention relates to enabling very complex computer application uses, data gathering, data processing, and data transmission, particularly in the context of using handheld or "palmtop" computers to gather the initial information for transmission to remote, higher-powered computers, which processes are not possible through practice in the present art to the same degree as is possible though practice of the present invention.

The present invention depends on, as applicable, the creation, use, or carrying out of the following components or steps:

A "script" which is a machine-readable document.

An apparatus for processing this script or "distilling" the meaning of the script into other representations which are reduced in size and optimized for various purposes, such as user interface generation, data processing, or data transmission.

"Distilled" representations of the script which are in general very greatly reduced in size or optimized for alternative purposes, which contain "meaning tags" for re-expansion of the distilled representations.

Data records which are stored in an efficient manner by completely separating the meaning of the data from the data itself.

An apparatus for regeneration or "expansion" of distilled representations for purposes of user-interface generation.

An apparatus for regeneration or "expansion" of distilled representations for purposes of data processing.

Authoring tools to simplify the process of script creation.

The present invention represents a new technology which allows the use of a single document, called a script, to serve many functions which were previously done by hand or by a number of separate tools. This process is called "distillation" for present purposes. Also part of the present methodology are new types of data records which carry internal information allowing great flexibility and efficiency in their use.

Some of the characteristics of this technology are:

Very efficient use of the resources of handheld computers.

Extremely space-effective data storage by complete separation of the "meaning" of the data from the data itself.

Self-describing data records which allow movement of data between machines having different internal data formats.

Simultaneous and automatic performance of multiple functions using a single document or "script".

Among these are:

Creation of user interface elements

Automatic user interface screen layout

Automatic creation of database entries and other storage records.

Automatic transfer of data records between mobile computers and other computers.

Specification of "filtering" to allow a single document to present only aspects relevant to the current situation.

Automatic generation of printed reports and other human-readable summaries of the underlying data.

Specification of a data hierarchy, which allows construction of user interfaces which can be rapidly navigated.

Customization of data processing on a per-user basis.

The distillation and expansion apparatus. In what follows we use the term "data record" or "record" to mean all of the data generated by a form or a computer program. This is equivalent to a "data file" produced by a conventional program. When referring to a single item within the data record we will use the term "field."

A key observation is that of the many aspects of a given document, only certain of these are relevant for a given use of the document. The distillation apparatus strips irrelevant aspects from a document, producing an alternative "distilled" representation appropriate to a specific use. At the same time, the distillation process may "pre-compute" data that is necessary to generate the user interface or form the data record, actually enhancing the script with information that was only implicit in the script's original form.

The examples we will consider are as follows:

The distilled data record, for which the page layout aspect is irrelevant.

The user interface apparatus, for which the data processing aspect is usually irrelevant.

The data processing apparatus, for which the contextual filter aspect is usually irrelevant.

The distilled data record. Consider the case of a user interface that consists of 1000 checkboxes each of which has a long descriptive label. If shown on a 50-line display this would comprise 20 pages of data. Clearly each checkbox can be stored as a single bit of data. However a single bit by itself is of no value if we do not have an associated "meaning" for this bit of data. In conventional general-purpose user interface display systems, such as those using HTML scripts and web browsers, the meaning of the data is transmitted along with the data (see the section on background). In the present system, a single 32-bit number or "meaning token" is included in the distilled data record, which serves to uniquely identify the original script upon which the data record was based. In one such implementation, this value is taken to be a time-stamp, based on the exact instant at which the script was last modified. This is a simple way to guarantee uniqueness of the script id (assuming the production of scripts is coordinated in some way so that we can guarantee no two are produced at the same instant.)

Suppose that after a script has been edited, it is run through an archiver which adds the time stamp to the script, for example, in the form:

SCRIPT ID=956074524 and then saves the script with this id as part of a file name or database key. This script could, for example, be saved with a file name:

SCRIPT_956074524.TXT

When the script is distilled and sent to the handheld computer, this key is also sent. The handheld then embeds this key in every data record produced based on this script. When this data record is then returned to a central location for processing, the key is returned as part of the data (here are using the terms "key" and "meaning token" interchangeably).

In this way the data may be transmitted at a density equal to its theoretical maximum of 1000 bits plus 32 bits of overhead for the meaning token. The expansion apparatus can then retrieve the original script, and use it to extract information related to the interpretation and processing of each bit within the transmitted data record.

So in a hypothetical example of a survey form consisting of 1000 checkboxes each with a twelve-character idtag (an idtag is required for each field when using a conventional html system) the data required for a single data record by the conventional system would be at least (assuming no other formatting-overhead and that the state of each checkbox is transmitted as a single byte of data, a conservative assumption), (1000*12)+(1000*1)=13000 bytes.

In the present system the data required is 4 bytes for the tag required to identify the original script, plus 1 bit per checkbox:

(4+1000)/8=129 bytes.

The methods taught by the present invention, therefore, improves storage and bandwidth efficiency by a factor of:

13000/129=100.77

Note that in principle further data compression schemes of a conventional nature such as run-length-encoding may be "layered" on top of this system so that even higher effective compression ratios are achieved.

Note also that the requirement of a 32-bit number as the "meaning token", i.e. the information used to retrieve the original script for expansion, is not necessary. Any convenient representation could be used.

Note also that the single-bit data type is not essential. Each data field may be a bit, an integer, a string, or any other data type. The single-bit data type is used here for illustration, the mechanism has been implemented for other data types, including textual data, as well.

Interpretation of the data record. The processing apparatus need only know that the data within the record is stored "in order", i.e. that the 100'th bit within the record corresponds to the 100'th field in the original script. Then, by retrieving the script indicated by the meaning-token, all the information specifying the meaning and processing for this bit may be retrieved and utilized.

Of course there need not be data present in the record for all fields. Unused fields may be skipped over using conventional escape codes which would remove the requirement that all fields be present in the record, providing further storage efficiencies.

Data representation. The distilled data record of the present invention, by convention, stores data in the binary format of the handheld processor. This data record is processed as an "object" which uses "access functions" to retrieve the data elements in the native form for the current machine. On the handheld machine, which typically has more limited processing power and which must provide a responsive interface, the data is already in the correct form and the access functions are compiled as simple data fetches. On the server machine, where processing power is greater, and the user interface responsiveness requirements are lower, the access functions are compiled to provide any necessary conversion.

An example of such a platform dependency is the byte order with which integers are stored. On the majority of handheld computers, integers are stored most-significant-byte first (the so-called "big endian" representation). Desktop machines however are overwhelmingly "little endian", meaning an integer is stored least-significant-byte first. Accordingly, the present data records are stored big-endian, so no reformatting is required on the handheld, but are automatically swapped by the present intelligent data records as part of the data expansion process.

The user interface apparatus. This apparatus, which for example may be embodied as a component of a handheld computer, uses a document distillation which may be in binary form and will include only that information required for the generation of the user interface and creation of distilled data records. In addition, it may make use of pre-computed values which are generated by the distillation process to reduce the computational burden on the handheld or other computer used to display the user interface.

Removal of irrelevant script aspects. In the sample script, the first subsection of the user interface contains a special tag, "PRINTCON SUBSECTION LABEL". This is a "print control" tag, which tells the data processing apparatus that the label that appears on the subsection should not be used when generating printed reports. The label used on the handheld device, "HPI" is highly abbreviated as is important for a device with an extremely limited display. The longer label, "History of Present Illness", described by the print control, is irrelevant to the generation of the user interface.

When the document is distilled to it's binary form and downloaded to the hand-held device, these print-control entries are entirely deleted. They are unnecessary and irrelevant to the user-interface apparatus.

Pre-computation of user interface logic. This user-interface distillation will frequently be in a binary form, to reduce the processing requirements associated with parsing the document. For example, the FIELD TYPE may be stored as an integer rather than a text string, to allow rapid numerical lookup of the correct processing code for a given field.

The pre-computation aspect of the distillation is well exhibited by the ENABLE strings shown in the topics section at the beginning of the script. These strings represent a list of bits, one bit per field in the document, and two strings per topic. When the user interface is displayed, the display device need only examine the string for the current topic and detail level to determine immediately which fields are enabled. The strings are not present when the script is initially created by the content author, but rather are generated by the distillation apparatus when the script is sent to the computer (typically a handheld computer) responsible for the user interface generation.

Let us examine in detail the pre-computation and use of the enable-bits described above. As part of the script processing, a program first builds a list of all topics. It also prepares an array of bits for each topic, which will define which fields in the script are enabled for that topic. It than passes through the script, examining the "enable" syntax for each field and setting the required bits in each topic's enable string.

For example, in the first field in the present sample script, we find the following directive:

TOPIC DLEVEL1=Pregnancy

This directive says "this field should be enabled if the topic is "Pregnancy".

Upon seeing this, the distillation process sets the first bit in the array of bits for the "Pregnancy" topic, and leaves the bit cleared for all other topics.

We then proceed to the second field, which has a more complex set of enable directives:

DEFAULT DLEVEL1

EXCLUDE TOPIC DLEVELL1=Wound Check

EXCLUDE TOPIC DLEVELL1=Suture Removal

The first directive says "this field is a default (always displayed) field at detail level 1". However the second two directives say "However exclude this field for the Wound Check and Suture Removal topics. The distillation process then sets the second bit of the bit arrays for all topics except the two that were excluded.

Additional layers of filtering may be implemented in a similar manner, as exemplified by additional directives in the first field:

SEX=female

MIN AGE YEARS=10

MAX AGE YEARS=55

These directives may be pre-processed into arrays in a manner similar to that done with the topic-enable information, or may be parsed at runtime in a less efficient manner once the bulk of the work has been done by the topic-enable mechanism.

Use of pre-computed logic by the handheld computer. When the script is downloaded to the handheld computer, we do not send all the directives defining the enabling of each field. Rather, we send, in binary form, the bit arrays computed above. Then, when the user selects a topic, e.g. a physician is seeing a patient for a Suture Removal, the handheld computer can determine whether a field number "n" should be displayed merely by examining bit number "n" in the bit array. This is an extremely fast operation for a microprocessor.

Were it not for the distillation process, the fields must be "parsed" at runtime, an extremely expensive computation even for a script that has been compiled into a binary form. The distillation process makes this dynamic re-configuring of the application on the handheld unit feasible and allows the display of extremely complex applications on a computer platform with very limited computational resources.

The data processing apparatus. This apparatus, which may be embodied as a software process on a server or other computer, needs information not required for user-interface generation. For example, the print-controls described in the previous section may be used by the data processing apparatus as part of the printed-report generation process.

However, note that information relating to the field-filtering and display generation may be irrelevant and excluded by the distilled representation used for data processing. For example, the "DEFAULT DLEVELL1" token, which tells the user-interface process that this field is a default field at complexity level 1, is irrelevant to the data processing. The data processing cares only that if data has been entered into this field, then it should be processed.

So, for example, if the data processor finds that bit number 173 in the data record has been set, it can go to the original script and look for relevant directives. If it finds a directive such as the following embedded in field number 173:

BILLING CODE 12345

It can decide that this information is relevant to the billing process, and automatically route an invoice to the financially responsible party, selecting the party and the charge level according to the code which was found.

Consider another example, the user-defined printout field. This field consists of a checkbox, which occupies a single bit in the distilled data record that is transferred from the handheld device to the processing device. The user-defined printout can be stored either in the original script or in a separate file of user definitions. When the data record is processed, the printout text is associated with this single bit, and a printed report of arbitrary length and complexity may be generated by the transmission of a single bit of data from the handheld device to the processing server. These user-defined fields may be further qualified by the source of the data (the user of the handheld device), or on other aspects of the data record, resulting in even greater flexibility in the processing aspect.

Variable token sets. Conventional computer languages are defined largely by the "tokens" they require. For example, we have presented in the present script the "FIELD TYPE" token:

FIELD TYPE=popup list

In the present system, the parsing apparatus may use alternative token sets so that this same line of script may be represented, e.g., as:

X=12

What we have done is allowed the distillation apparatus to substitute a new set of tokens. As long as the parsing apparatus is aware of the "current token set" then the distilled script will be parsed successfully.

Two examples will clarify the value of this mechanism. In the example given, the advantage is a large reduction in script storage and bandwidth requirements. In the first token set, the script is "human readable" but this one line of script requires 21 bytes of storage. In the second example, the script is no longer meaningful to a human, but the storage/bandwidth requirement has been lowered to 4 bytes of data.

Consider a second example taken from the "topics" section of the present script:

TOPIC IDTAG=Chest Pain

Consider a possible alternative representation:

CHIEF COMPLAINT=Chest Pain

In the second representation, the abstraction of a "TOPIC IDTAG" has been replaced with the term "CHIEF COMPLAINT". This term is meaningful to a health care professional. While the processing of the script is unchanged, the script has been rendered meaningful to a non-programmer in the industry towards which the script has been targeted.

Variable token sets may be implemented by having a token set directive in the script

TOKEN SET=3

Then, the processing program may choose a token set, as for example an array of pointers to strings. It may also choose, if transforming the script for another purpose such as transmission to a handheld device with limited memory and bandwidth, to replace the tokens with those from a different token set. To do this it must of course replace the TOKEN SET directive before sending the script to a new destination.

The distillation-expansion-processing cycle. Let us take as an example the present hypothetical 1000-checkbox questionnaire used by field representatives using palmtop computers with very limited bandwidth and storage capacity at remote sites. The following steps occur.

1) Author makes a list of the questions he would liked asked at the remote site. This can be an extremely simple representation such as a plain-text file listing the questions.

2) This list is converted to a script using either a gui-based authoring tool or a conventional text editor.

A distillation apparatus then processes the script, inserting the meaning token, computing and inserting any pre-computed information such as the enable bits described above, and finally archiving the script with a name or database ID based on the meaning token.

3) A distillation apparatus removes all aspects of the document that are irrelevant to user-interface generation to produce a distilled representation. Included in this representation is the "meaning tag" and the pre-computed information required by the user-interface process. Note that this representation may be fairly large because it must include all the labels necessary for display generation, although it will still be vastly smaller than the original document.

4) The distilled representation is transmitted to the handheld computer. This is a one-time-only operation and so is not severely bandwidth constrained. In general this operation need not be done remotely but may be "loaded" onto the mobile device in a preparation stage.

5) The field agent uses the device to collect data records. Note that each data record will require only 1000 bits (for the data) plus 32 bits (for the meaning-tag), for a total of 1032 bits or only 129 bytes of data for a 50 page form! The field agent collects 1000 data records, comprising a mere 129,000 bytes of data. Well within the storage limits of current palmtop computers.

6) The field agent transmits the data records by conventional wireless mechanisms to a central office for processing.

7) The expansion apparatus at the central office extracts the meaning tag from each data record, retrieves the associated script, and uses the information in the script to interpret and process each bit in the data record.

To summarize the sequence of events:

SCRIPT→distillation→Interface spec

Interface spec→remote computer

Interface spec→data record data record→expansion→analysis/reporting process

```
//
// The following script id is a unique identifier
// that can be used to associate this particular
// script with a data record produced from it.
//
    SCRIPT ID=956074524
//
// The following language version and token set values
// allow transformation of this script into other language
// versions and syntaxes.
//
DAPL VERSION=1
TOKEN SET=3
// Topic definitions allow the user interface process to
// selectively hide or display information depending on the
// "current topic"
//
    BEGIN TOPIC DEFINITIONS
        BEGIN TOPIC
            TOPIC IDTAG=Major Burn
            // The following ENABLED strings are a hexadecimal representation
            // of a set of bits, one bit per field, which specifies whether a field
            // is enabled for the given topic. There are two enable strings,
            // one for "detail level 1" and another for "detail level 2"
            //
            // Note that the following enable information is generated automatically
            // As part of a "distillation" process ...
            ENABLED DLEVEL1=FFFFFFFFFFFFFFFF7FF7AFFFFFFFFF3FFFFF1
            ENABLED DLEVEL2=FFFFFFFFFFFFFFFFFFF7AFFFFFFFFFFFFFFF1
        END TOPIC
        BEGIN TOPIC
            TOPIC IDTAG=Chest Pain
            ENABLED DLEVEL1=FFFFFFFFFFFFFFFF7FF7AFFFFFFFFF3FFFFF1
            ENABLED DLEVEL2=FFFFFFFFFFFFFFFFFFF7AFFFFFFFFFFFFFFF1
        END TOPIC (many more topics)
    END TOPIC DEFINITIONS
//
// Division of the script into sections and subsections
// allow automatic generation of hierarchical navigation
// systems in user interfaces.
//
BEGIN SECTION=HPI
    BEGIN SUBSECTION=General
        BEGIN FIELD
            FIELD TYPE=checkbox
            LABEL=home pregnancy test used
            TOPIC DLEVEL1=Pregnancy
            SEX=female
            MIN AGE YEARS=10
            MAX AGE YEARS=55
        END FIELD
        BEGIN FIELD
            FIELD TYPE=popup list
            LABEL=happened at:
            BEGIN LIST
                LIST ENTRY=home
                LIST ENTRY=work
                LIST ENTRY=school
```

-continued

```
            LIST ENTRY=street
            LIST ENTRY=public place
            LIST ENTRY=hospital
            LIST ENTRY=unknown
        END LIST
        DEFAULT DLEVEL1
        EXCLUDE TOPIC DLEVEL1=Wound Check
        EXCLUDE TOPIC DLEVEL1=Suture Removal
      END FIELD
      BEGIN FIELD
        FIELD TYPE=checkbox
        LABEL=cardio pulmonary arrest
        TOPIC DLEVEL1=Cardio-Resp. Insuff.
      END FIELD
      BEGIN FIELD
        FIELD TYPE=checkbox
        LABEL=normal HEENT exam
        PRINTCON USERDEFINED
        DEFAULT DLEVEL1
      END FIELD
    END SUBSECTION
    BEGIN SUBSECTION=Prehosp. Treat.
      PRINTCON SUBSECTION LABEL=Pre-hospital treatment
      BEGIN FIELD
        FIELD TYPE=yesno popup
        LABEL=CPR in field
        BEGIN LIST
            LIST ENTRY=family
            LIST ENTRY=friend(s)
            LIST ENTRY=bystander
            LIST ENTRY=health/safety provider
        END LIST
        DEFAULT DLEVEL2
        EXCLUDE TOPIC DLEVEL1=Wound Check
        EXCLUDE TOPIC DLEVEL1=Burn Check
        EXCLUDE TOPIC DLEVEL1=Suture Removal
      END FIELD
    END SUBSECTION
END SECTION
```

I claim:

1. A method for gathering, transferring, and processing data using an information retrieval computer and an information processing computer, such method comprising the steps of:

creating a computer-readable script document comprising:

sequential data fields modifiable by said information retrieval computer to reflect information input by a user of said information retrieval computer, and interpretable and translatable, once modified by said information retrieval computer, by said information processing computer to generate human perceptible information said data fields being sequenced in a predetermined order to respectively correspond to like-ordered elements of translation means useful by said data processing computer whereby said data fields, once modified by said information retrieval computer, is translatable by said data processing computer to reflect human perceptible information corresponding to information input by said user;

identifying means for uniquely identifying said script document to said data processing computer for enabling said information processing computer to apply said translation means to said data fields, once modified by said information retrieval computer, and generate said human perceptible information based thereon;

selecting first distillation means, said first distillation means for creating a first distilled computer file by carrying out a first distillation step by which said script document is modified to remove at least a portion of the content thereof which neither identifies said script document for later processing nor enables modification of said data fields by said information retrieval computer according to input by said user thereof to reflect gathered information;

actuating said first distillation means to generate said first distilled computer file;

transferring said first distilled computer file to said information retrieval computer;

through user input into said information retrieval computer, modifying said data fields of said first distilled computer file to reflect information corresponding respectively to each said data field;

transferring said first distilled computer file, as modified by said information retrieval computer, to a said information processing computer;

actuating said information processing computer to effect an expansion step whereby said information processing computer applies said identifying means to properly associate said translation means to said first distilled computer file, as modified by said information retrieval computer, and applies said translation means thereto for translating said first distilled computer file into human perceptible indicia.

2. The method of claim 1 wherein said first distilled computer file is configured by said first distillation means whereby each data field in said first distilled computer file occupies but one bit of data space while resident on said information retrieval computer.

3. The method of claim 1 further comprising the steps of:

creating a hierarchical user interface means for implementation by said information retrieval computer in selectively displaying or not displaying user-perceptible indicia for prompting input pursuant to which at least some of said data fields of said first distilled computer file are modified, said process of selectively displaying or not displaying at least some of said data fields being controlled by conditional parameters of said hierarchical user interface means which depend said selectively displaying or hiding at least some of said data fields upon the presence or manner or modification of other said data fields related by said conditional parameters; and inputting said hierarchical user interface means into said information retrieval computer.

4. The method of claim 2 further comprising the steps of:

creating a hierarchical user interface means for implementation by said information retrieval computer in selectively displaying or not displaying user-perceptible indicia for prompting input pursuant to which at least some of said data fields of said first distilled computer file are modified, said process of selectively displaying or not displaying at least some of said data fields being controlled by conditional parameters of said hierarchical user interface means which depend said selectively displaying or hiding at least some of said data fields upon the presence or manner or modification of other said data fields related by said conditional parameters; and inputting said hierarchical user interface means into said information retrieval computer.

* * * * *